June 27, 1939.   H. BREWSTER   2,164,150
AUTOMOBILE CONSTRUCTION
Filed March 11, 1938   2 Sheets-Sheet 1

INVENTOR
*Henry Brewster*
BY
ATTORNEYS

June 27, 1939.  H. BREWSTER  2,164,150
AUTOMOBILE CONSTRUCTION
Filed March 11, 1938  2 Sheets-Sheet 2
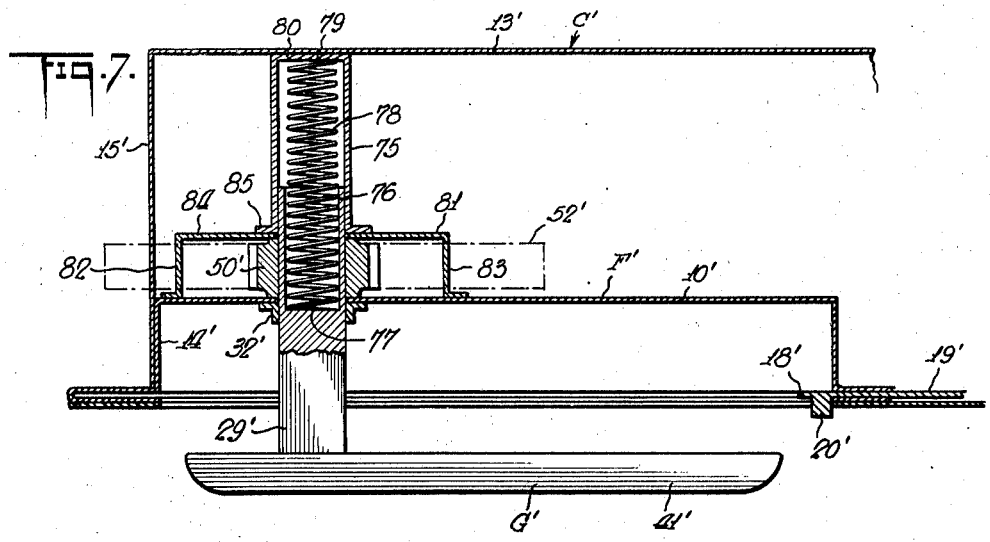
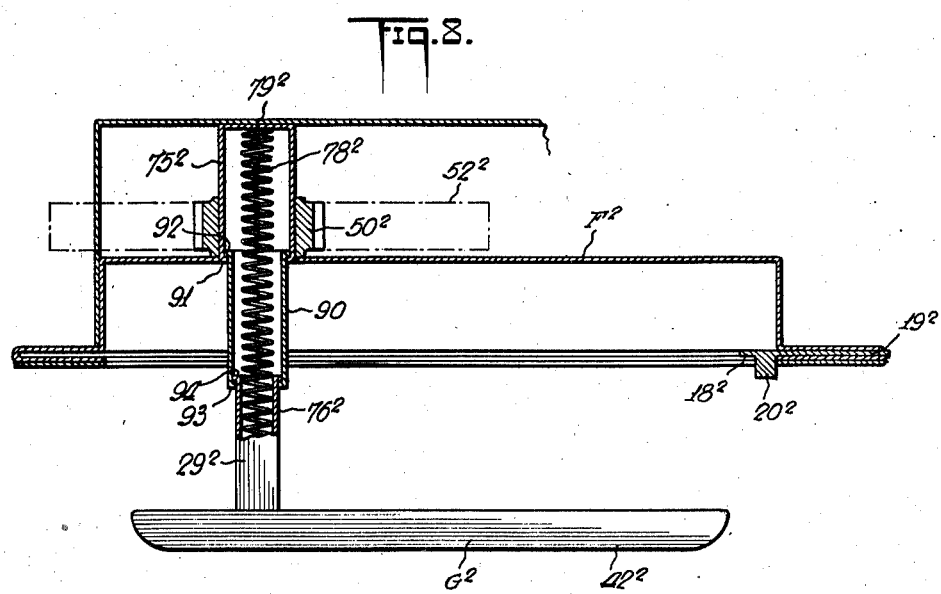
INVENTOR
Henry Brewster
BY
ATTORNEY Patented June 27, 1939

2,164,150

UNITED STATES PATENT OFFICE 2,164,150

AUTOMOBILE CONSTRUCTION

Henry Brewster, New York, N. Y.

Application March 11, 1938, Serial No. 195,242

13 Claims. (Cl. 296—44)

The present invention relates to automobile constructions and particularly relates to a method of arranging or positioning automobile hardware in combination with automobile doors.

The usual automobile hardware constructions, particularly the handles for opening and closing the doors and for raising or lowering the windows, project from both the interior and exterior sides of the doors. They not only often tend to catch and tear the clothing of the user of the automobile, but in addition, frequently cause injury.

It is, therefore, among the objects of the present invention to provide an improved hardware arrangement for automobile doors, in which the various handles will be positioned on and combined with the door in such a manner that there will be no liability of the clothing of the user being torn, without any decrease in the accessibility of said handles and without increase in the difficulty of manipulation of the same.

In accomplishing the above objects, it has been found most satisfactory to provide a concealed door handle construction in which the handle will be retained inside of a recess, preferably by a cover plate and in which the handle will be projected or may be moved into the position in which it is to be utilized when said cover plate is removed.

This may be done either by a spring which will press the entire handle structure outwardly and which may be received in a telescoping structure in the base of the handle, as in the pivot mount thereof. Or it may be done by providing a biasing spring which will incline the handle inwardly in the recess, but which will permit withdrawal of the handle when the cover plate is withdrawn.

Figure 1:
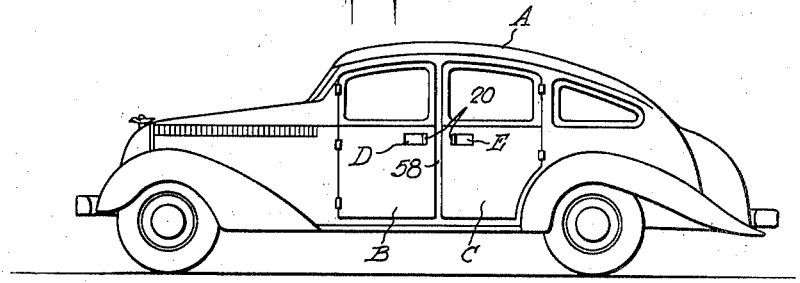
Figure 2:
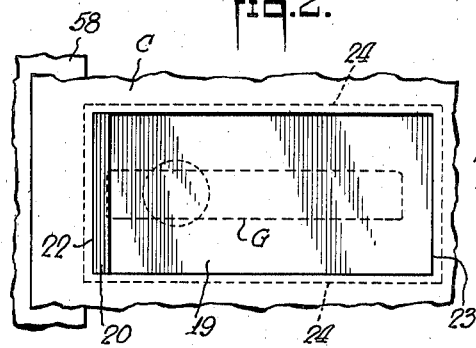
Figure 3:
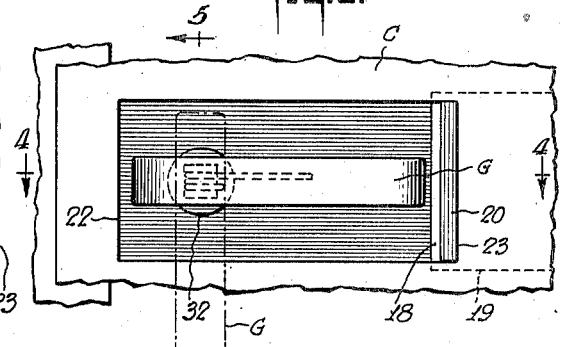
Figure 4:
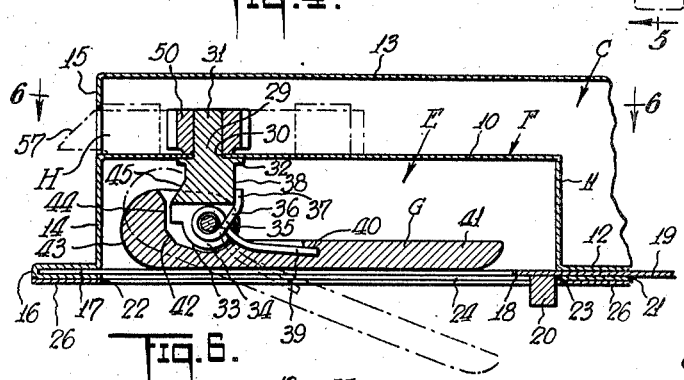
Figure 5:
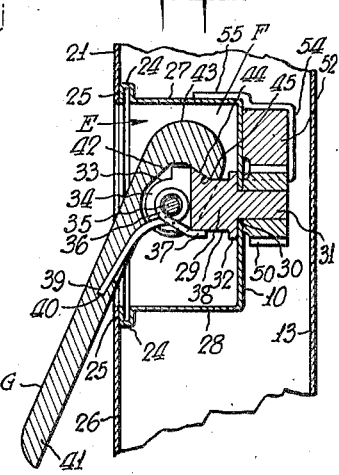
Figure 6:
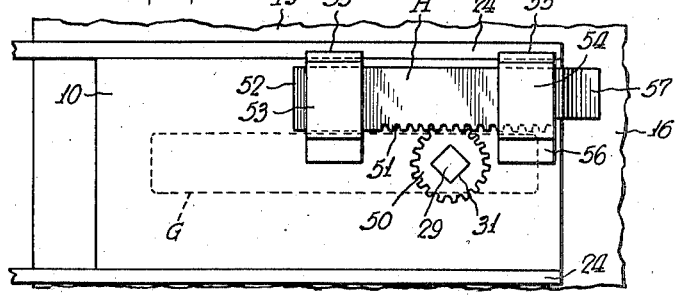

In the drawings which illustrate one of the various possible embodiments of the present invention, but to which the present invention is by no means restricted, since many changes and alternatives are possible, all within the scope of the present invention, Fig. 1 is a side view of an automotive vehicle showing the application of the present invention to conceal the handle structures, Fig. 2 is a fragmentary side view showing one of the closures of Fig. 1 upon an enlarged scale as compared to Fig. 1, Fig. 3 is a side view showing the cover withdrawn and the handle in accessible position, Figs. 4 and 5 are transverse sectional views upon the lines 4—4 and 5—5 of Fig. 3, the handle in Fig. 5 being shown 90° removed from the solid line position of the handle as shown in Figs. 3 and 4, Fig. 6 is a rear view upon the line 6—6 of Fig. 4 showing the reciprocating latch element in solid lines, and Figs. 7 and 8 are horizontal transverse sectional views of alternative handle constructions.

Referring to Fig. 1, the automobile body A is provided with the doors B and C which have the handle structures D and E shown with the covers closed.

Referring to Figs. 2 to 6, the handle structure E includes a recess or recessed casing F, a handle G and a reciprocating latch H.

The casing F consists of a bottom wall 10 and side walls 11, which may be formed together with the front panel 12 of the door structure C. The bottom 10 of the recess F may be substantially inside of the inside panel 13 of the door structure C.

The end wall 14 of the door C forms part of the recessed casing F and is flush with the flange 15. This flange 15 is integral with the rear panel 13. The end wall portion 14 is provided with a continuation which is bent over into a U-shaped channel 16 at the front of the door, the legs of which channel are separated to form a slot 17, in which may be received the end 18 of the sliding cover 19.

The projection 20 on the end of said sliding cover 19 serves as a handle. When the cover 19 is altogether withdrawn and opened, the projection 20 abuts the edges 23 of the plate 21 on the face of the door C. When the cover 19 is altogether pressed home, the projection 20 abuts the edge 22 of the outside leg of the U-shaped channel members 24 which are spot-welded or otherwise permanently connected at 25 in Fig. 5 to the panel 21. The covering 26 on the front of the panel 21 may consist of a varnish or other suitable finish or may consist of an extra sheet metal covering.

The handle G is provided with a pivotal mount 29 in the bottom 10 of the recessed member F. The pivotal mounting 29 has a reduced square or polygonal portion 31 extending through the opening 30 in the base 10 of the recess F. The shoulder or collar 32 on said pivotal mount 29 abuts the bottom of the recess F, as shown best in Figs. 4 and 5.

The pivot mount 29 at its outer end is enlarged, as indicated at 33, and is slotted as indicated at 34. Through the slotted portion 34 passes the pivot pin 35.

Coiled around the pivot pin 35 is the central portion of the expulsion or retraction spring 36. The spring 36 has an inside extension 37 which may abut against the side 38 of the post 29 when the spring is an expulsion spring or which may be permanently attached and secured to the side 38 of the pivot mount, as by welding, by wire loops, and so forth when the spring is a retraction spring and an outside extension 39 fitting into the recess 40 in the elongated portion 41 of the handle structure G.

The rear portion of the handle 41 is provided with a recess 42 which fits over the enlarged portion 33 of the pivot mount 29 and encloses the slot 35 and the coil spring 36.

The rear end 43 of the elongated structure 41 is provided with a beveled face 44 which is designed to abut the sloping face 45 of the pivot mount 29 and limit outward extension of the handle G to the position as indicated in Fig. 5.

The spring 36 normally retains the handle G in the position as indicated in Fig. 4 and the handle G is only moved to the position of Fig. 5 by the hand of the user.

It will be noted in Fig. 5 that the handle portion 41 may be moved out sufficiently by the hand to clear the outside edge of the recess F. The extension 31 of the pivot mount 29 carries the pinion 50. The pinion 50 may be press-fitted upon the square or polygonal shaped extension 31 of the pivot mount 29.

It will be noted in Fig. 6 that the pinion 50 meshes with the rack 51 on the reciprocating latch bar 52 in the latch structure H.

The bar 52 is guided by the brackets 53 and 54, which are attached to the top wall 27 of the recess F by the extensions 55. The lower edges of the brackets 53 and 54 are provided with the tabs 56 which may be spot-welded or otherwise connected to the base 10 of the recess F. The beveled end portion 57 of the bar 52 is designed to latch into a suitable recess in the structure 58 of the automobile (see Fig. 1).

In operation the handles are retracted by the spring 36 to the position as indicated in solid lines in Figs. 3 and 4 and the covers 19 are closed as indicated in Figs. 1 and 2, as for example by spring or other automatic means, if desired. When, however, it is desirable to open the door from the outside, the covers 19 of the structures D and E may be placed in retracted position, as indicated in Figs. 3 and 4, and the handles G may be removed from the recess and turned 90° to withdraw the latch H, as indicated in Figs. 3 to 6.

It will be noted from the dotted line positions of Figs. 3 and 4 and the solid line position of Fig. 5, that there can be sufficient movement of the handle G to clear the edges of the recess F when it is swung to the 90° opening position.

When the door C has been opened a spring may be provided in connection with the pivot mount 29 to swing the handle back to the solid line positions, as shown in Figs. 3 and 4, whereupon the retraction spring 36 will immediately snap the handle back into the recess F and the cover 19 may be manually or automatically closed.

If desired, instead of locking the handles themselves, the cover plates 19 may be provided with locks to lock the car when parked.

This same recessed construction may also be applied to the handles interiorly positioned on the insides of the doors B and C for opening the doors or for raising or lowering the windows.

It will be noted particularly that all sliding of the cover 19 is done interiorly and in back of the face 26 that the friction arising with sliding of the cover 19 will not scratch or mar the exterior finish of the doors B and C.

Referring to the alternative construction shown in Fig. 7, correspondingly functioning parts being indicated by the same numerals primed, the handle G' is provided with a bar 41', which is rigidly connected to the pivot mount 29'. The mount 29' is square and fits through the sleeve 32' having a square opening. The cylinder 75 receives the extension 76 of the pivot mount 29'. The coil spring 78 is received in the extension 76 and abuts the pivot mount 29' at the bottom of the extension 76. The other end of the coil spring 78 abuts against the bottom of the sleeve 75 at 79.

The base 80 of the sleeve 75 contacts with the inside plate 13' of the door structure C'. The pivot mount 29', and particularly the sleeve extension 76 thereof, is also designed to slide through the pinion 50'. The pinion 50' is enclosed in a casing 81, through openings in the end walls 82 and 83 of which project the bar 52'. The bottom or rear 84 of the casing 81 is abutted by the flange 85 of the sleeve 75.

In operation, as soon as the door 19' is retracted by the handle 20', the handle G' will immediately be projected outwardly by the spring 76 acting upon the bottom 77 of the recess formed by the sleeve 76. This will permit the handle G' to be grasped and moved to unlatch the door through the pinion 50' and the latch bar 52'.

After opening of the door, the handle G' is pressed back into the recess F' and the cover 19' is moved home.

The alternative construction shown in Fig. 8 differs from that shown in Fig. 7, in that a double telescoping connection is employed to enable greater separation and removal of the handle $G^2$ from the recess $F^2$.

In the structure of Fig. 8, similarly functioning parts are indicated by the same numerals or letters as in Figs. 1 to 7 provided, however, with a superior 2.

In the construction of Fig. 8, there is an intermediate sleeve 90, which fits around the sleeve extension $76^2$ of the pivot mount $29^2$ of the handle $G^2$ and fits inside of the sleeve $75^2$. The coil spring $78^2$ extends through the sleeve elements $75^2$, 90 and $76^2$ and abuts at its inside end against the bottom $79^2$ of the sleeve $75^2$.

The three sleeve portions $76^2$, 90 and $75^2$ are square and fit inside of one another. The end of the sleeve $75^2$ is turned inwardly as indicated at 91 to limit the removal of the sleeve 90, and the inner end of the sleeve 90 is provided with an inturned flange 92 to engage said inside flange 91 in position as shown in Fig. 8.

The outside end of the sleeve 90 is provided with an inturned flange 93 which engages the outturned flange 94 at the inside end of the sleeve portion $76^2$. These engaging flanges 91 and 92 and 93 and 94 limit the extension of the handle $G^2$ from the recess $F^2$.

It is thus apparent that the applicant has provided a simple, inexpensive, attractive construction for concealing door handles upon automobiles, which is also applicable for other purposes, in which not only will the exterior of the car be more decorative, but, in addition, the liability of these handles catching on objects or injuring persons will be greatly reduced. Furthermore the locking of the car is much simpler.

The depressions, recesses or boxes F, F', F², will be invisible when the handles G, G', G² are enclosed therein and covered by the sliding elements 19, 19' and 19². The sliding elements 19, 19', 19² slide in guideways or runways 24 in back of the upper and lower edges of said boxes F, F' and F².

The guideways or runways 24 extend sufficiently beyond the recesses F, F', F² to enclose the upper and lower edges of the sliding cover 19, 19' and 19² even when completely withdrawn.

The springs 36, 78 and 78² might be omitted and the handles moved to extended or concealed position without any spring element.

If desired, the springs 78 and 78² might be retraction springs instead of extension springs and the spring 36 might be an expulsion spring similar to the springs 78 and 78².

The pivot mount 29 may be provided with a spring to move the handle G back automatically from the position of Fig. 5 to the solid line position of Fig. 3 when the door B or C has been opened and the handle G released by the hand.

The sliding covers 19 may be arranged so that they could be swung out of position either upwardly or downwardly, as for example on a pivotal mount.

The handle G and the recesses F might also be constructed as disclosed in my application Ser. No. 116,572, filed December 18, 1936.

The slideways or guideway 24 might also be positioned on the outside of the door plate 19 and in such case the recess F might be stamped or pressed out of the face plate 19.

The handle structure G is preferably made so flat (say ¼" in thickness) that the recess F will be no more than about ½" in depth.

The interior faces of the handle structure are roughened, corrugated or grooved to eliminate slippage.

The protection of the handle in the recess F and the face plate 19 will also prevent accumulation of snow or dirt thereon during winter or on driving on dirt roads or through dust storms.

It is to be understood, of course, that the construction of the present application may be utilized in connection with other closures or doors than used on automobiles, as for example upon closures or doors used on closets and so forth.

The invention, however, is not intended to be restricted to any particular construction or arrangement of parts, or to any particular application of any such construction, or to any specific method of operation, or manner of use, or to any of various details thereof, herein shown and described, as the same may be modified in various particulars or be applied in many varied relations without departing from the spirit and scope of the claimed invention, the practical embodiments herein illustrated and described merely showing some of the various features entering into the application of the invention.

What is claimed is:

1. An automobile door construction comprising a latch, an actuator to move said latch, a handle for said actuator, a cup shaped recess in said door to receive said actuator sliding plate means to cover said cup shaped recess, guideways at the edges of said recess to receive and guide edges of said plate and means to enable said handle to be elevated from said recess for actuation of said latch, said handle being normally positioned entirely within said recess when said cover is closed.

2. An automobile door construction comprising a reciprocating latch, an actuator to move said latch, a handle for said actuator, a recess in said door to receive said actuator, a sliding plate to cover said recess, guideways at the edges of said recess to receive and guide edges of said plate and means to enable said handle to be elevated from said recess for actuation of said latch, said handle being normally positioned entirely within said recess when said cover is closed.

3. An automobile door construction comprising a latch, an actuator to move said latch, a handle for said actuator, a recess in said door to receive said actuator, a sliding plate to cover said recess flush with said door, guideways at the edges of said recess to receive and guide edges of said plate and means to enable said handle to be elevated from said recess for actuation of said latch, said handle being normally positioned entirely within said recess when said cover is closed.

4. An automobile door construction comprising a latch, an actuator having a swinging handle to move said latch, a recess in said door to receive said actuator, sliding plate means to cover said recess, guideways at the edges of said recess to receive and guide edges of said plate and means to enable said handle to be elevated from said recess for actuation of said latch, said handle being normally positioned entirely within said recess when said cover is closed.

5. In an automobile door construction, a face plate, an end plate, a back plate, a latch bar between said plates projecting through said end plate, a recess in said face plate, said recess having a back plate, a pivotal mount extending through the back plate of said recess, a pinion on said mount in back of said recess, a handle mounted on said pivotal mount normally positioned in said recess in back of the plane of said face plate, a cover plate to cover said recess and spring means enabling said handle to be elevated from said recess when said handle is actuated.

6. The construction of claim 5, said cover plate being provided with a sliding connection to said front plate.

7. The construction of claim 5, said pivot mount being provided with a spring to press said handle out of the recess when said cover plate is removed.

8. The construction of claim 5, said pivot mount being provided with a spring to retract said handle into said recess after said latch is actuated.

9. The combination of an automobile door with an outer panel having a relatively deep wide recess formed in the outer panel thereof, a reciprocating latch positioned adjacent said recess and an elongated handle member to actuate said latch, said handle member having a pivot mount at the bottom of said recess extending perpendicularly through the bottom of the recess and means to hold said handle entirely within said recess when not in use and so as not to project beyond said panel and also to permit elevation of said handle from said recess when the handle is grasped by the hand preparatory to operation of said latch within the upper portion thereof and below the surface of the outer panel, said handle being substantially spaced from the bottom and sides of said recess as to enable said handle to be grasped while held in said recess, said last mentioned means including a sliding cover to hold said handle entirely within said recess.

10. The combination of an automobile door with an outer panel having a relatively deep wide recess formed in the outer panel thereof, a reciprocating latch positioned adjacent said recess and an elongated handle member to actuate said latch, said handle member having a pivot mount at the bottom of said recess extending perpendicularly through the bottom of the recess and means to hold said handle entirely within said recess when not in use and so as not to project beyond said panel and also to permit elevation of said handle from said recess when the handle is grasped by the hand preparatory to operation of said latch within the upper portion thereof and below the surface of the outer panel, said handle being substantially spaced from the bottom and sides of said recess as to enable said handle to be grasped while held in said recess, said last mentioned means including a coil spring and said pivot mount having a telescoping tubular construction to receive said coil spring.

11. An automobile door having front, back and edge panels, said front panel being recessed and said recess having bottom and side plates, the bottom plate being parallel to said front and back panels, a removable cover plate for said recess substantially flush with said front panel, a reciprocating latch positioned in back of said recess closely adjacent the bottom plate of said recess, said edge panel having an opening through which said latch may project, a pivot mount extending perpendicularly through the bottom plate of said recess carrying a pinion in back of said bottom plate, a rack on said latch meshing with said pinion, a handle connected to said pivot mount at the outer end thereof, said handle being retained within said recess when not in use and being elevated from said recess, when in use, a coil spring actuated when said handle is withdrawn from said recess and biasing said handle in one direction, guideways at the edges of said recess to receive and guide the edges of said cover plate, said handle being positioned entirely within said recess when said cover plate is moved to cover said recess.

12. An automobile door construction comprising an outer panel having a recess, a handle having a pivotal mount extending through the recessed portion of said panel, means to project said handle from said recess and means to hold said handle within said recess, said former means including a coil spring and said latter means including a cover plate for the recess.

13. An automobile door construction comprising an outer panel having a recess, a handle having a pivotal mount extending through the recessed portion of said panel, means to project said handle from said recess and means to hold said handle within said recess, said former means including a coil spring and said latter means including a cover plate for the recess, said pivot mount being tubular and having telescoping sections and said coil spring being enclosed within said sections and pressing said sections apart.

HENRY BREWSTER.